United States Patent (10) Patent No.: US 8,783,448 B2
Shoji et al. (45) Date of Patent: Jul. 22, 2014

(54) CONVEYER BELT AND APPARATUS

(75) Inventors: Susumu Shoji, Kobe (JP); Kazuro Fukui, Kobe (JP); Takaomi Kurahashi, Ayabe (JP); Masato Iida, Ayabe (JP)

(73) Assignees: Susumu Shoji, Kobe-shi (JP); Sanwa Techno Co., Ltd., Kobe-shi (JP)

( * ) Notice: Subject to any disclaimer, the term of this patent is extended or adjusted under 35 U.S.C. 154(b) by 0 days.

(21) Appl. No.: 14/009,042

(22) PCT Filed: Apr. 1, 2011

(86) PCT No.: PCT/JP2011/058463
§ 371 (c)(1),
(2), (4) Date: Oct. 3, 2013

(87) PCT Pub. No.: WO2012/137283
PCT Pub. Date: Oct. 11, 2012

(65) Prior Publication Data
US 2014/0083824 A1 Mar. 27, 2014

(51) Int. Cl.
*B65G 15/54* (2006.01)
*D02G 3/06* (2006.01)

(52) U.S. Cl.
CPC ..................................... *B65G 15/54* (2013.01)
USPC ........................... 198/844.1; 198/846; 57/230

(58) Field of Classification Search
USPC .............. 198/689.1, 844.1, 846, 957; 57/230, 57/244; 428/175
See application file for complete search history.

(56) References Cited

U.S. PATENT DOCUMENTS 2,679,677 A * 6/1954 Crandall ....................... 442/219
3,595,730 A * 7/1971 Richardson, Jr. et al. ...... 442/37
3,871,946 A * 3/1975 Romanski et al. ............ 474/268
3,983,761 A * 10/1976 Stewart ......................... 198/846

(Continued)

FOREIGN PATENT DOCUMENTS

JP 59-053701 A 3/1984
JP 59-156013 U 10/1984

(Continued)

OTHER PUBLICATIONS

International Search Report of PCT/JP2011/058463, mailing date of Jul. 19, 2011.

*Primary Examiner* — Douglas Hess
(74) *Attorney, Agent, or Firm* — Westerman, Hattori, Daniels & Adrian, LLP

(57) ABSTRACT

A conveyor belt comprising knit fabric of high practicality, and an apparatus which uses such a conveyor belt. The conveyor belt includes weft knit fabric. Suction of air from below belt(s) is used to convey sheet-like and/or small thing(s) which are object(s) to be conveyed that are placed. The strength of filament(s) of knit fabric at side end(s) is adequately maintained. Loops exhibit mutual intertwining of filament(s) Pitch Ps of loops in width direction is formed so as to be smaller than pitch Pg of loops in conveying direction. Adjacent loops are mutually flattened and filament(s) of loop(s) are entangled, mutual intertwining of filament(s) causes knit fabric to have suppressed percentage elongation and increased strength in conveying direction, fraying of filament(s) at side end(s) of belt(s) is prevented, and strength is adequately increased.

6 Claims, 5 Drawing Sheets

(a)

(b)

(56) References Cited

U.S. PATENT DOCUMENTS

| | | | |
|---|---|---|---|
| 4,106,613 A * | 8/1978 | Thomson | 198/847 |
| 4,296,855 A * | 10/1981 | Blalock | 198/847 |
| 4,403,632 A * | 9/1983 | Romanski et al. | 139/383 A |
| 4,407,333 A * | 10/1983 | Fowkes | 139/415 |
| 4,433,493 A * | 2/1984 | Poisson | 34/116 |
| 4,839,220 A * | 6/1989 | Stijntjes et al. | 442/208 |
| 5,695,043 A * | 12/1997 | Maezuru et al. | 198/689.1 |
| 6,000,532 A * | 12/1999 | Eckhardt | 198/847 |
| 7,207,558 B2 * | 4/2007 | Edinger | 271/197 |
| 7,404,429 B2 * | 7/2008 | Graichen | 160/89 |
| 7,438,178 B2 * | 10/2008 | Chahal et al. | 198/847 |
| 7,523,626 B2 * | 4/2009 | Enzien et al. | 66/195 |
| 7,866,069 B2 * | 1/2011 | Bayo Molla | 38/8 |

FOREIGN PATENT DOCUMENTS

| | | |
|---|---|---|
| JP | 61-200811 U | 12/1986 |
| JP | 63-139248 U | 9/1988 |
| JP | 03-118917 U | 12/1991 |
| JP | 05-019377 U | 3/1993 |
| JP | 11-314721 A | 11/1999 |
| JP | 2000-155404 A | 6/2000 |
| JP | 2000-191175 A | 7/2000 |
| JP | 2002-235251 A | 8/2002 |
| JP | 2007-308819 A | 11/2007 |
| JP | 2009-097701 A | 5/2009 |
| JP | 2009-149440 A | 7/2009 |
| JP | 2009-184793 A | 8/2009 |

* cited by examiner (a)          (b)

(a) Knit fabric under conditions not causing deformaiton of loops (b) Knit fabric under conditions causing reduction in pitch in stitch direction and deformation of loops

CONVEYER BELT AND APPARATUS

TECHNICAL FIELD

The present invention relates to a conveyor belt that conveys a lightweight sheet-like object or lightweight pill or granule-like object. It is generally the case, when using a conveyor belt to convey any of a variety of medicinal pills or other such small separate objects or any of a variety of separate sheets of sheet-like papers at high speed, that the paper or small object, being lightweight, is while being conveyed apt to float above the conveyor belt, which can prevent it from being conveyed in its proper orientation. The present invention therefore relates to a conveyor belt having a structure such as will, when using a conveyor belt to convey paper for a copy machine, i.e., electrophotographic apparatus, or medicinal pills or other such small objects which are lightweight individual objects at high speed, prevent such papers or medicinal pills or other such small objects which are lightweight individual objects from floating above the conveyor belt while being conveyed and allow them to be conveyed in their proper orientations, and in particular to a conveyor belt comprising knit fabric in which the belt material is formed from fibers.

BACKGROUND ART

Conventionally, conveyor belts—also called transport belts—which convey objects have typically been used most regularly at factories and the like where mass production is taking place. Such belts are made using materials such as rubber, woven fabric, wire mesh, steel plate, and so forth. Such a belt might be suspended as a result of being formed into a loop about belt rollers, i.e., pulleys, provided at either end, an object which is to be conveyed thereby being conveyed when placed on such a belt due to motion of the belt. And such conveyor belts which convey objects to be conveyed are used not only at the aforesaid factories and the like where mass production is taking place, but may be incorporated within treatment apparatuses or processing apparatuses that treat or process individual objects, being employed within such apparatuses to convey objects to be treated or objects to be processed. Examples of such processing apparatuses include, for example, conveyor belts that convey medicinal pills or other such small objects, conveyor belts that convey copier paper for electrophotographic apparatuses within the apparatus, and so forth.

Conventionally known as such conveyor belts are those that have been made into belts for conveying any of a variety of objects. Variously developed examples of structures of such conveyor belts will be described in turn below.

First, a conveyor belt is proposed that is a conveyor belt which comprises a mesh belt woven from yarn comprising synthetic fibers and which is formed by causing reinforcing synthetic fiber fabric to cover and fuse with the ends on either side of this mesh belt (see, for example, Patent Reference No. 1).

Second, a belt is proposed which is formed by laminating a rubber elastic layer to one face of a stretch knit fabric (see, for example, Patent Reference No. 2).

Third, a conveyor belt is proposed which has a belt core that is woven in mesh-like fashion from glass fibers, the belt being such that a plurality of seal strips formed from resin or flexible material are integrally provided in row-like fashion in the conveying direction, being formed so as to protrude from the inner and outer surfaces thereof, and the belt side ends are moreover reinforced with fabric or other such reinforcing material in such fashion as to straddle the belt core (see, for example, Patent Reference No. 3).

Fourth is a conveyor belt which is a filter mesh belt formed from a mesh portion formed between portions formed at either side in the long direction and a plurality of reinforcing portions arranged so as to cross the mesh portion, these side portions and these reinforcing portions being woven more tightly than the mesh portion and being imparted with more rigidity than the mesh portion. Hot-melt fibers are moreover woven into the side portions and reinforcing portions, application of heat treatment thereto causing these to be molded together in integral fashion, this integrally molded belt being what is proposed (see, for example, Patent Reference No. 4).

Fifth, proposed is a belt comprising a 1-mm to 2-mm warp parallel to the mesh belt conveying direction and comprising a 0.1-mm to 0.5-mm weft perpendicular to this warp, the mesh belt which has a mesh opening ratio of 15% to 40% being coated or impregnated with silicone rubber for formation thereof (see, for example, Patent Reference No. 5).

Sixth, proposed is a belt which comprises a solid belt, holes for air permeability being formed in this solid belt, irregular groove shapes parallel to the belt conveying direction being present, height of the irregular groove shapes being not less than 0.1 mm, the irregular shapes repeating with a periodicity that is not less than 1 mm, height of unevenness in paper which is the object to be conveyed being reduced by suction means (see, for example, Patent Reference No. 6).

Seventh, proposed is transport belt wherein an air-permeable transport belt comprising a mesh belt is formed from yarn comprising fiber strands of twisted yarn in a vertical direction extending in the transport direction, and cross yarn extending in such fashion as to cross the transport direction and intersecting the yarns comprising fiber strands in the vertical direction, the gap between yarns comprising fiber strands in the vertical direction being larger than the gap between cross yarns in the horizontal direction (see, for example, Patent Reference No. 7).

Eighth, proposed is a belt which is a mesh formed from cloth made in plain weave wherein the mesh pitch is set so as to be between 100 μm and 170 μm, more solid yarn than twisted yarn is employed, and the difference in height between warp yarns and weft yarns where fibers intersect is set so as to be 20 μm to 100 μm (see, for example, Patent Reference No. 8).

Ninth, a conveyor belt is proposed which has been imparted with antislip functionality, there being elasticity due to rubber at a surface of a belt having a mesh structure (see, for example, Patent Reference No. 9).

Tenth, a technique is proposed in the context of a method of manufacturing stockinette hosiery in which heat is applied within a range such as will cause applied heat to melt and bond thermally bondable yarn filaments without causing melting of heat-shrinkable yarn filaments, causing the knit textile to shrink and causing bonding due to thermally bondable yarn filaments so as to prevent fraying of the mesh (see, for example, Patent Reference No. 10).

Eleventh, proposed is a fabric for clothing use in which a main yarn comprising polyester yarn or cotton yarn or mixed yarn containing both of these and acrylic yarn or the like is used and rib stitching is carried out to create a knit textile, and a polyolefin yarn which is comparatively thin and which undergoes plastic deformation is used as plating yarn to carry out plating by knitting this together with the acrylic main yarn over the entirety thereof, to form a fabric having good shape retention characteristics in which the polyolefin plating yarn surface is not present at the front (see, for example, Patent Reference No. 11).

However, the foregoing proposed conveyor belts which comprise mesh belts have the problem that fraying of yarn occurs at the belt side ends, processing being implemented at the belt side ends in the foregoing Patent Reference No. 1, Patent Reference No. 2, and Patent Reference No. 3 to address this problem. Furthermore, to increase strength and endurance, Patent Reference No. 5 is a mesh belt in which warp yarns are made thicker than weft yarns, diameter of warp yarns being made 1 mm to 2 mm, with diameter of weft yarns being made 0.1 mm to 0.5 mm. However, because this mesh belt is such that thickness of the warp yarn at the mesh is increased to 1 mm to 2 mm, it is of insufficient flexibility for use as a conveyor belt. Furthermore and in addition, mesh constituted from plain weave such as can be seen in the conventional art at Patent Reference No. 8 requires strategies including those for reinforcing strength and preventing lateral displacement and fraying at the side ends of the conveyor belt; for example, secondary treatment and reinforcing materials are required to prevent fraying, and so this results in increased cost.

PRIOR ART REFERENCES

Patent References

Patent Reference No. 1: Japanese Utility Model Application Publication Kokai No. S61[1986]-200811
Patent Reference No. 2: Japanese Utility Model Application Publication Kokai No. S63[1988]-139248
Patent Reference No. 3: Japanese Utility Model Application Publication Kokai No. H3[1991]-118917
Patent Reference No. 4: Japanese Utility Model Application Publication Kokai No. H5[1993]-19377
Patent Reference No. 5: Japanese Patent Application Publication Kokai No. 2000-155404
Patent Reference No. 6: Japanese Patent Application Publication Kokai No. 2000-191175
Patent Reference No. 7: Japanese Patent Application Publication Kokai No. 2002-235251
Patent Reference No. 8: Japanese Patent Application Publication Kokai No. 2009-184793
Patent Reference No. 9: Japanese Patent Application Publication Kokai No. 2009-149440
Patent Reference No. 10: Japanese Patent Application Publication Kokai No. S59[1984]-53701
Patent Reference No. 11: Japanese Patent Application Publication Kokai No. 2007-308819

SUMMARY OF INVENTION

Problems to be Solved by Invention

Now, when a conveyor belt made up of woven fabric is to be used to convey objects to be conveyed, as a result of employment of a mesh belt in which the conveyor belt is provided with a mesh portion having air permeability, it will be possible by causing suction of air to occur by way of this mesh portion to cause an object to be conveyed which is placed on the mesh portion to be stably conveyed at high speed. However, such a conveyor belt in the form of a mesh belt will experience fraying of filament in the mesh at the side ends of the conveyor belt. For this reason, strategies will be required including those for preventing meandering due to lateral displacement of the conveyor belt or weakening of the conveyor belt due to fraying at the side ends. That is, to prevent fraying at side ends of this conveyor belt in the form of a mesh belt, it will be necessary to carry out reinforcement using reinforcing materials, or carry out some sort of secondary treatment at such side end portions, as a result of which cost will be increased. Now, to achieve satisfactory endurance and strength at mesh portions, a conveyor belt might be formed in which warp yarn diameter is increased to 1 mm to 2 mm as at the invention which can be seen in Patent Reference No. 5, but this will result in a conveyor belt that is lacking in flexibility. On the other hand, if knit fabric is formed into a belt which is to be used as a conveyor belt, because the fact that knit fabric is too flexible makes it unsuitable for use as a conveyor belt without modification, in forming a conveyor belt therefrom it has been necessary for mitigation of flexibility that a rubber elastic body be laminated to the belt comprising knit fabric.

Such a mesh belt has had the following problems. With a mesh belt comprising woven fabric, 1) there has been the problem of fraying of yarn at side ends of the belt at portions having mesh structure; 2) to prevent meandering or lateral displacement of the belt, it has been necessary to provide guide members at belt side ends, but because there are no stepped regions which can serve as guide members at belt side ends, carrying out secondary treatment so as to permit provision of guide members has caused cost to rise; 3) strength is insufficient when the entire surface is in the form of a mesh belt comprising a mesh structure, and to increase strength it has been necessary to employ extremely thick yarn to form the mesh belt; 4) to mitigate flexibility of knit fabric when forming a conveyor belt from knit fabric, lamination of rubber, and also creation of holes, has been necessary; 5) with a laminated belt comprising a rubber elastic body and knit fabric or woven fabric, the fact that lamination is carried out causes increase in cost, making it expensive; and 6) because knit fabric has high percentage elongation, it is impossible for knit fabric to be employed as a conveyor belt in the state in which it exists upon being knit in ordinary fashion.

A problem to be solved by the present invention is to solve the foregoing problems, to provide a conveyor belt comprising knit fabric of high practicality, and to provide an apparatus which uses such a conveyor belt comprising knit fabric.

Means for Solving Problems

Of the means in accordance with the present invention for solving the foregoing problems, a first means is a conveyor belt comprising knit fabric and suited for when paper and sheet-like things or objects are to be conveyed at high speed by virtue of air permeability by suction of air, the conveyor belt being such that it comprises weft knit fabric; yarn from which the conveyor belt is formed is filament comprising synthetic continuous fiber; the yarn filament exhibits mutual intertwining; knit pattern is such that pitch of mesh loops in a stitch direction which is a width direction is smaller than pitch of mesh loops in a gauge direction which is a conveying direction; a state is maintained in which mutually contacting mesh loops are deformed and loop filament is entangled, strength being increased in the conveying direction as a result of mutual intertwining of filament; and strength is increased and fraying of yarn filament at belt side ends is prevented during conveying by the conveyor belt.

A second means is a conveyor belt comprising knit fabric according to the first means which is such that the conveyor belt which comprises weft knit fabric has gaps that are produced by the knit fabric; and the yarn employed in the knit fabric is yarn comprising monofilament, flexural stress and heat causing the monofilament yarn to undergo plastic deformation at mesh loop locations where this yarn monofilament mutually intersects and becomes entangled, or the yarn employed in the knit fabric is yarn comprising a plurality of filaments, flexural stress and heat causing the yarn, which is such that filament exhibiting plastic deformation as a result of exposure to heat is included among the plurality of filaments, to undergo plastic deformation at mesh loop locations where the plurality of filaments of this yarn mutually intersect and become entangled, such that the entangled state is maintained.

A third means is a conveyor belt comprising knit fabric according to the second means which is such that the belt, in which flexural stress and heat have caused the yarn to undergo plastic deformation such that an entangled state is maintained, is a conveyor belt in which the yarn causes the front surface and the back surface to both have the same coefficient of friction, or in which the yarn causes the front surface and the back surface to have different coefficients of friction.

A fourth means is a conveyor belt comprising knit fabric according to the third means which is such that, to increase coefficients of friction at the conveyor belt in which the yarn causes the front surface and the back surface to have different coefficients of friction, the yarn is yarn which comprises a plurality of filaments; the belt is knit from yarn which has been subjected to twisting and in which low-melting-point elastic filament is included within the yarn which comprises a plurality of filaments, or is knit using low-melting-point elastic filament and monofilament in accordance with a plating technique, flexural stress during knitting causing filament other than the aforesaid low-melting-point elastic filament to undergo plastic deformation, and heat-setting causing this low-melting-point elastic filament to fuse, stabilizing the intersecting and entangled state; and where twisted yarn or covered yarn is used, coefficient of friction is increased at the front and the back of the belt; and if a plating technique is employed, coefficient of friction is increased at whichever of the front surface and/or the back surface it is required.

A fifth means is a conveyor belt comprising knit fabric according to the second or third means which is such that the yarn is yarn which contains inlay yarn of low percentage elongation; and knitting this yarn into the belt at an arbitrary location in the width direction thereof suppresses percentage elongation in the conveying direction and regulates meandering of the conveyor belt.

A sixth means is a conveyor apparatus employing a conveyor belt comprising knit fabric which is such that the conveyor belt comprising knit fabric according to any one of the first through fifth means has been adapted for use with an apparatus having conveyor means requiring air permeability with respect to air suction.

Benefit of the Invention

In accordance with the foregoing first means of the present invention, a structure is achieved in which there is no fraying of yarn at side ends of the conveyor belt. In accordance with the second means, because the yarn of the knit fabric from which the conveyor belt is formed is such that filament exhibiting plastic deformation as a result of exposure to a prescribed amount of heat is included among a plurality of filaments, flexural stress and a prescribed amount of heat cause the mesh loops which comprise this yarn to undergo plastic deformation and to be maintained in an entangled state such that curvature of loops is increased and the degree of change in elongation is reduced. Moreover, in accordance with the third means, because loops of knit fabric are formed from filament having a large coefficient of friction, the force with which the conveyor belt grips an object to be conveyed is increased, making it possible to stably convey the object to be conveyed. In accordance with the fourth means, because the filament having a large coefficient of friction is such that low-melting-point elastic filament is included within the plurality of filaments, thermal fusing or heat-setting causes still further increase in the force with which the conveyor belt grips an object to be conveyed, making it possible to more stably convey the object to be conveyed. In accordance with the fifth means, suppression of elongation in the conveying direction of the conveyor belt makes it possible to inhibit meandering of the conveyor belt. In accordance with the sixth means, because a belt according to the first means through the fifth means has been adapted for use as a conveyor belt within the apparatus interior at a conveyor apparatus, it will be possible in the context of this conveyor apparatus to stably convey an object to be conveyed such that the belt operates smoothly at the apparatus interior without occurrence of meandering.

EMBODIMENTS FOR CARRYING OUT THE INVENTION

Figure 1:
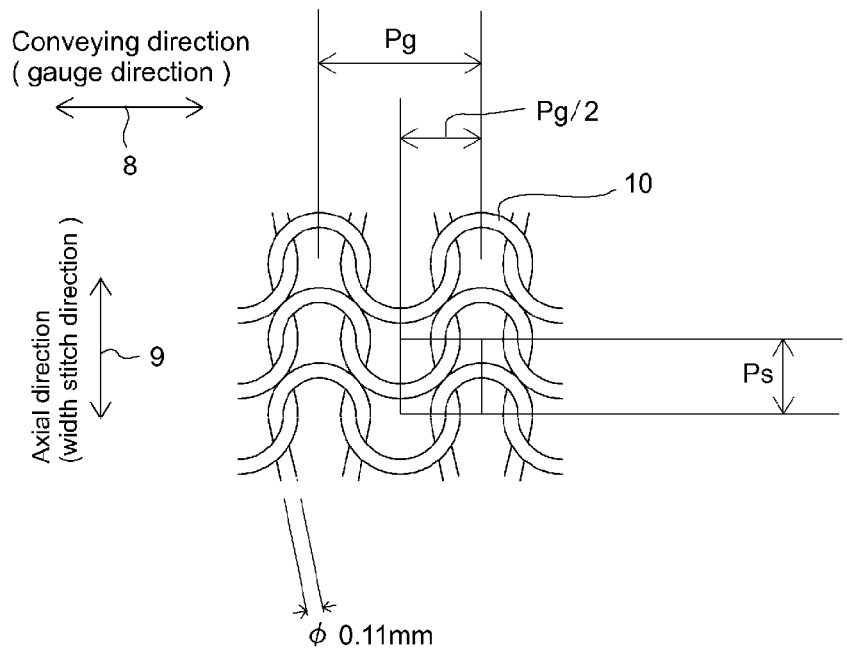
FIG. 1 Drawing showing loop structure obtained when filament diameter $\phi$ is 0.11 mm and pitch in the stitch direction is changed in accordance with FORMULA (1).

Embodiments of the present invention are described with reference to tables and drawings. A first embodiment of the present invention, being an embodiment associated with the invention as recited in claim 1 and being a conveyor belt 1 comprising weft knit fabric 4, is the conveyor belt 1 shown in FIG. 4 in which suction of air, i.e., vacuum, from below conveyor belt 1 is utilized to convey objects to be conveyed which comprise sheet-like objects and/or small objects that are placed on conveyor belt 1. At this conveyor belt 1, fraying due to deterioration of filaments 7 of yarn 6 at side ends 3 of belt 2 during operation thereof is prevented, and strength of filaments 7 of yarn 6 at side ends 3 is adequately maintained. It is thus preferred that the knit fabric from which conveyor belt 1 in accordance with the present invention is formed be weft knit textile, it being possible for this to be either circular weft-knit textile or flat knit textile. Of these, circular knit textile is preferred due to the fact that, there are no ends, the strength of the knit textile itself is superior, and because a continuous structure can be obtained in which the gaps that are present in the knit textile comprise a uniform pattern, there is reduced tendency for occurrence of nonuniformity in the force of suction of air at the surface of the belt 2. Furthermore, as knit pattern for weft knit textile, this may be selected from among those made in plain knit (also referred to as jersey knit), those made in rib stitch (also referred to as ribbing), and/or those made in purl stitch (also referred to as links-links stitch). Furthermore, variations on the foregoing knit patterns may be used, it also being possible to employ those in which direction and/or fiber density is controlled for regulation of stretching. As examples of such weft knit textiles, weft knit textiles such as cardigan stitch, circular interlock stitch, 1/1 tuck stitch, 2×2 rib stitch, and mesh stitch may be cited. Moreover, any of various operations such as knit, tuck, miss (welt), transfer, inlay (insertion), and so forth may be combined as appropriate with the foregoing to produce weft knit textiles of various structures.

Moreover, this conveyor belt 1 is formed from belt 2 which requires air permeability so that suction of air can occur as paper or other such sheet-like objects or medicinal pills or other such small objects or other such objects to be conveyed which are placed on belt 2 can be conveyed at high speed thereby. This belt 2 is formed from weft knit fabric 4; yarn 6, which forms knit pattern 5 making up this weft knit fabric 4, comprising filaments 7 which are continuous synthetic fibers. This belt 2 comprises knit fabric 4 in which filaments 7 of this yarn 6 are intertwined with adjacent filaments 7. This belt 2 comprises knit pattern 5 in which pitch Ps of mesh loops in the stitch direction, i.e., width direction 9, is smaller than pitch Pg of mesh loops in the gauge direction, i.e., conveying direction 8. In addition, mutually contacting loops 10 and filaments 7 are made to undergo deformation, causing filaments 7 of loops 10 to assume a mutually intertwined state; and by causing this state to be maintained, strength of belt 2 in conveying direction 8 is increased; fraying of yarn 6, i.e., filaments 7, at side ends 3 of belt 2 during operation of conveyor belt 1 is prevented; and strength of conveyor belt 1 comprising knit fabric 4 is adequately increased.

As shown in FIG. 1, it was found by the inventors that the relationship among pitch Pg of mesh loops in the gauge direction, i.e., conveying direction 8; pitch Ps of mesh loops 10 in the stitch direction, i.e., width direction 9 perpendicular to conveying direction 8; and filament diameter φ, can be expressed as indicated at FORMULA (1), below.

$$Ps^2+(Pg/2)^2=(Pg/2+2\phi)^2 \quad (1)$$

which can be rewritten as $Ps^2=2\phi\cdot Pg+4\phi^2$ (1)

where:
Ps=pitch in stitch direction,
Pg=pitch in gauge direction, and
φ=filament diameter.
Moreover, note that Ps, above, is defined such that:
Ps0 indicates that neighboring loops are in mutual contact but deformation of loops does not occur, and
Ps1 indicates that neighboring loops are in mutual contact and deformation of loops does occur.

By carrying out knitting so as to cause pitch Ps of loops in the stitch direction to be pitch Ps1 for which deformation of loops 10 occurs in accordance with this FORMULA (1), these loops 10 can be maintained in an entangled state in which they are deformed such that filaments 7 of loops 10 are located where they can become intertwined with filaments 7 of adjacent loops 10. And in accompaniment to such deformation of loops 10, knit fabric 4 assumes a configuration in which twisting of yarn 6 is intensified at locations where these filaments 7 are mutually intertwined. Conveyor belt 1, serving as means in accordance with the invention associated with claim 1 of the present application, comprises knit fabric 4 having such a configuration.

Moreover, a second embodiment, being an embodiment associated with the invention as recited in claim 2, is such that loops 10 of knit fabric 4 comprising weft knit fabric are formed from yarn 6 comprising monofilament. Twisting of yarn 6 being intensified at loop 10 locations where monofilament of adjacent loops 10 in the mesh of this knit fabric 4 mutually intersect and become intertwined, a state is therefore assumed in which flexural stresses act on yarn 6, and such flexural stresses together with application of a prescribed amount of heat will cause yarn 6 comprising monofilament to undergo plastic deformation and the entangled state to be maintained, producing the configuration of knit fabric 4. Alternatively, yarn 6 of knit fabric 4 might be formed from a plurality of filaments, in which case because yarn 6 will be configured such that the plurality of filaments include filament(s) 7 that undergo plastic deformation upon application of a prescribed amount of heat at loop 10 locations where the plurality of filaments of such yarn 6 mutually intersect and become intertwined, flexural stresses together with application of a prescribed amount of heat will cause the plurality of filaments of such yarn 6 to undergo plastic deformation and a state to be maintained in which the plurality of filaments of loops 10 are mutually entangled, producing the configuration of knit fabric 4. Conveyor belt 1, serving as second means in accordance with the present invention, comprises knit fabric 4 having such a configuration. As described above, heat from heat treatment carried out while a plurality of filaments are in an intertwined state makes it possible for loops 10 to be imparted with plastic deformation. In such case, while there is no limitation with respect to the method used for the heat treatment by which the foregoing plastic deformation is imparted thereto, dry heat-setting, steam heat-setting, and so forth may be employed. Where dry heat-setting is carried out, a setting device such as a pin tenter may for example used in a method in which hot air is used to carry out heat-setting of the knit textile. In such case, it is preferred that setting temperature be 100° C. to 220° C. Furthermore, where steam heat-setting is carried out, examples may be given which include methods in which steam is used to carry out heat-setting while weft knit textile is for example draped over a frame, or methods in which heat-setting is carried out by insertion in hot water. In such cases, it is preferred that setting temperature be 70° C. to 130° C.

Moreover, in addition to the configuration of knit fabric 4 as described above, conveyor belt 1 in accordance with the present invention is such that reduction in pitch Ps of loops in the stitch direction causes increase in the number of stitches per unit width and increases strength in the conveying direction. Moreover, at conveyor belt 1, by causing pitch Ps of loops in the stitch direction, in which direction loops 10 can be deformed, to be Ps1, in which state mutual contact of loops 10 is such that there is deformation of loops 10, slack between neighboring loops 10 in the gauge direction is diminished and elongation of knit fabric 4 in the conveying direction is reduced.

Moreover, a third embodiment, being an embodiment associated with the invention as recited in claim 3, is a conveyor belt 1 comprising knit fabric 4 in which loops 10 of weft knit fabric 4 are formed from filament(s) 7 having a high coefficient of friction which is not less than 0.5, or are formed from filament(s) 7 having a high coefficient of friction which is not less than 0.5 where this includes the effect of elastic filament(s) present therewithin which have the effect of increasing the coefficient of friction thereof.

It should be mentioned that the conveyor apparatus 11, at which operation of conveyor belt 1 permits conveyance of objects to be conveyed, may be of two types. The first type of apparatus is that in which locations of drive roller(s) 12 and idler roller(s) 13 which serve as belt pulley(s) are stationary. The second type of apparatus is that in which tension is applied to belt 2 from a load.

At this first type of apparatus in which locations of drive roller(s) 12 and idler roller(s) 13 which serve as belt pulley(s) are stationary, belt 2 is made to have tension due to stretching forces, friction between idler roller(s) 13 and drive roller(s) 12 which cause driving and the tension of this belt 2 causing driving of belt 2 as a result of gripping forces produced in combination with these rollers. A belt 2 for this type of apparatus will therefore be a belt 2 in which there is tension due to stretching forces and in which there is little change in tension, i.e., one in which there is little strain. In addition hereto, it being desirable that the belt be one in which belt surface(s) have high coefficient of friction so as to permit production of gripping forces due to friction, resin roller(s) and/or metal roller(s) may be employed as drive roller(s), and it is for this reason that conveyor belt 1 in the invention associated with claim 3 should have a coefficient of friction which is not less than 0.5. Furthermore, where a belt having a low coefficient of friction at an interior surface is to be employed, this may be used in combination with drive roller(s) comprising rubber roller(s) or the like in which roller surface(s) have high coefficient(s) of friction. Moreover, to prevent meandering of belt 2 during operation of this type of apparatus, drive roller(s) 12 and idler roller(s) 13 which serve as belt pulley(s) may be shaped such that they are crowned in arch-like fashion to prevent meandering of the belt.

At the second type of apparatus in which tension is applied to belt 2 from a load, the belt 2 which is used should basically be one that tends not to stretch very easily. The reason for this is to reduce fluctuations in speed during operation of belt 2. It should be mentioned that with this type of apparatus, because tension of belt 2 may be varied as desired through an apparatus-side procedure in which distance between rollers is adjusted, the apparatus permits a long service life. Properties required for a belt 2 which is to be used at such an apparatus will therefore be such that either belt 2 displays no elongation or the percentage elongation of belt 2 is low; and in addition, the coefficient of friction at the interior surface of belt 2 must match coefficient(s) of friction at drive roller surface(s). Note that since too high of a gripping force between belt and roller will cause occurrence of an unusual sound when the belt releases from the roller, it will be necessary to employ a belt which matches the material of roller.

Figure 5:
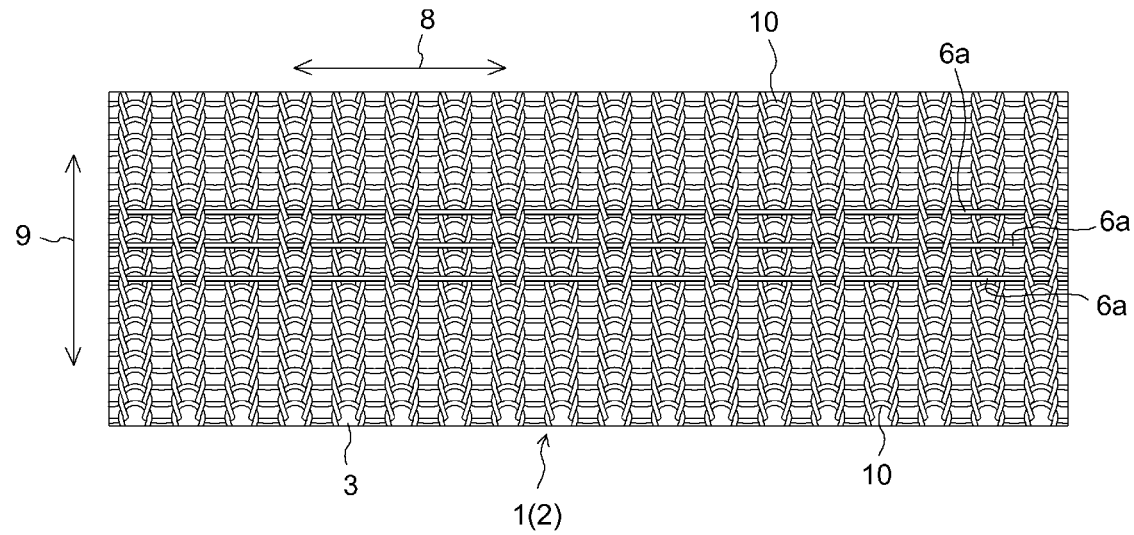
FIG. 5 Plan view of conveyor belt, showing conveyor belt comprising knit fabric containing inlay yarn in accordance with the present invention.

Moreover, a fourth embodiment, being an embodiment associated with the invention as recited in claim 4, is a conveyor belt 1 in accordance with the present invention which is such that knit fabric 4 employing yarn 6 comprising filaments 7 of different melting points serving as inlay yarn 6a which as shown in FIG. 5 is added thereto as a result of being inserted therein in the conveying direction 8 at central potions in the width direction 9 of knit pattern in knit fabric 4 at belt 2 or knit fabric 4 comprising nylon serving as material knitted together therewith during plating which employs yarn 6 comprising filaments 7 of different melting points is subjected to heat-setting at 115° C. to cause stabilization of dimension such that plastic deformation of filaments 7 at locations of entanglement of filaments 7 is in a state in which it has been carried out to adequate degree, heat also causing filaments 7 to plastically deform and thermally fuse, such that fraying at side ends 3 of belt 2 is prevented in conveyor belt 1.

Moreover, at conveyor belt 1, inlay yarn 6a comprising elastic filament(s) which is material having low melting point(s) is inserted therein at central portion(s) in the width direction 9 of knit pattern 5 in knit fabric 4, permitting achievement of increased gripping, i.e., coefficient of friction, at belt 2 simultaneous with thermal fusing.

Furthermore, a fifth embodiment, being an embodiment associated with the invention as recited in claim 5, is a conveyor belt 1 in which, for prevention of meandering, inlay yarn of low percentage elongation is inserted in the conveying direction at central portion(s) in the width direction 9 of belt 2, elongation in the conveying direction 8 at central portion(s) in the width direction 9 being made smaller than elongation in the conveying direction 8 at side ends 3 of belt 2, and prevention of meandering being achieved at conveyor belt 1. Conveyor belt 1 is a means in which belt 2 may have any of such inlay yarns 6a.

Moreover, a sixth embodiment, being an embodiment associated with the invention as recited in claim 6, is related to the invention as recited in any of the claims associated with the foregoing claims 1 through 5. It is a conveyor apparatus 11 which employs any among such conveyor belts 1 comprising knit fabric 4, where conveyor belt 1 is such that knit fabric 4 is made to have low percentage elongation in the conveying direction, being a conveyor belt 1 in which the fact that plastic deformation is carried out to adequate degree, or the fact that thermal fusing has been made to occur, permits prevention of fraying of filament(s) 7 of yarn 6 at side ends 3 of belt 2, and/or being a conveyor belt 1 in which inlay yarn of low percentage elongation is inserted in the conveying direction at central portion(s) in the stitch direction, i.e., width direction 9, so that elongation in the conveying direction 8 is reduced and prevention of meandering of belt 2 is achieved, or other such conveyor belt 1 that has been adapted for use with a feed apparatus 11 which is an apparatus having conveyor means requiring air permeability.

Figure 2:
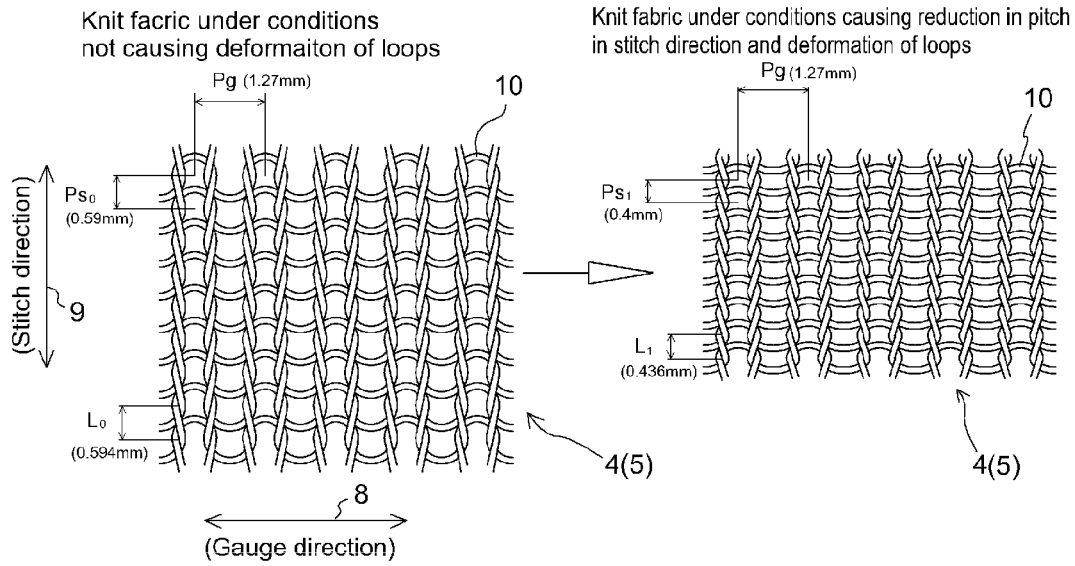
FIG. 2 Plan views of knit fabric in which filament diameter $\phi$ is 0.11 mm, (a) being a plan view of knit fabric for conditions under which deformation of loops does not occur, and (b) being a plan view of knit fabric for conditions under which pitch in stitch direction is reduced and deformation of loops occurs.

It should be mentioned that FIG. 2 shows the situation obtained when filament diameter φ is 0.11 mm and the magnitude of pitch Ps of loops in the stitch direction, i.e., width direction 9, is changed in accordance with FORMULA (1), above. Comparing knit fabric 4 which is knit under conditions not causing deformation at loops 10 at left shown at (a) in this FIG. 2 and knit fabric 4 which is knit under conditions causing deformation at loops 10 at right shown at (b) in FIG. 2, in terms of unit lengths, pitch Ps of loops in the stitch direction is reduced from a Ps0 of 0.59 mm at (a) in FIG. 2 to a pitch Ps1 of magnitude 0.4 mm at which deformation of loops 10 occurs as shown at (b) in FIG. 2. Thus, the magnitude of the distance L0 between intertwinings of filament(s) 7 of loops 10 under nondeforming conditions, when pitch Ps of loops 10 in the stitch direction, i.e., width direction 9, is unreduced, which is to say when deformation of loops 10 does not occur, is, as shown at (a) in FIG. 2, 0.594 mm. On the other hand, the distance L1 between neighboring intertwinings of filament(s) 7 under conditions causing deformation of loops is, as shown at (b) in FIG. 2, 0.436 mm. Thus, reducing pitch Ps of loops 10 in the stitch direction, i.e., width direction 9, causes increase in density of pitch Pg of loops 10 in the stitch direction, i.e., width direction 9, and increase in strength in the conveying direction 8. Furthermore, as described above, when the magnitude of the distance L1 between intertwinings of filament(s) under conditions causing deformation of loops is reduced such that it is 0.436 mm, plastic deformation of filament(s) 7 will tend to occur more readily. As a result, it will be possible to increase strength and to prevent fraying of filament(s) 7 at side ends 3 of belt 2 when conveyor belt 1 is in use. In addition, curvature of loops 10 being increased in accompaniment to deformation of loops 10, the degree of change in elongation is reduced.

Figure 3:
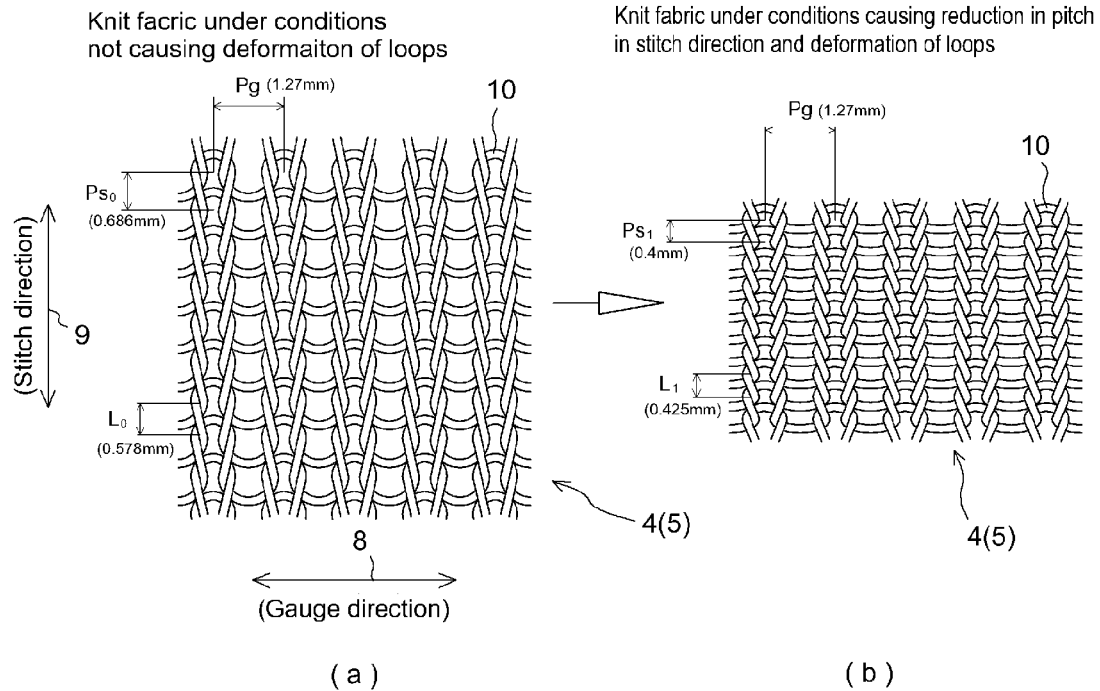
FIG. 3 Plan views of knit fabric in which filament diameter $\phi$ is 0.15 mm, (a) being a plan view of knit fabric for conditions under which deformation of loops does not occur, and (b) being a plan view of knit fabric for conditions under which pitch in stitch direction is reduced and deformation of loops occurs.

Next, FIG. 3 is a drawing showing the situation obtained when filament diameter φ is 0.15 mm, this being larger than the filament diameter φ of 0.11 mm at FIG. 2, and the magnitude of pitch Ps of loops in the stitch direction, i.e., width direction 9, is changed. As with a filament diameter φ of 0.11 mm at FIG. 2, here as well where this filament diameter φ is 0.15 mm, in terms of unit lengths, pitch Ps of loops 10 in the stitch direction, i.e., width direction 9, is reduced from a Ps0 of 0.686 mm at (a) in FIG. 3 to a pitch Ps1 of magnitude 0.4 mm at which deformation of loops 10 occurs as shown at (b) in FIG. 3. Thus, the magnitude of the distance L0 between intertwinings of filament(s) 7 of loops 10 under nondeforming conditions, when pitch Ps of loops 10 in the stitch direction, i.e., width direction 9, is unreduced, which is to say when deformation of loops 10 does not occur, is, as shown at (a) in FIG. 3, 0.578 mm. On the other hand, the distance L1 between neighboring intertwinings of filament(s) 7 under conditions causing deformation of loops is, as shown at (b) in FIG. 3, 0.425 mm. Thus, reducing pitch Ps of loops 10 in the stitch direction, i.e., width direction 9, causes increase in density of pitch Pg of loops 10 in the stitch direction, i.e., width direction 9, and increase in strength in the conveying direction 8. Furthermore, as described above, when the magnitude of the distance L1 between intertwinings of filament(s) under conditions causing deformation of loops is reduced such that it is 0.425 mm, plastic deformation of filament(s) 7 will tend to occur more readily. As a result, it will be possible to increase strength and to prevent fraying of filament(s) 7 at side ends 3 of belt 2 when conveyor belt 1 is in use. Moreover, curvature of loops 10 being increased in accompaniment to deformation of loops 10, the degree of change in elongation is reduced. It should be mentioned that such tendencies are even more pronounced here than when filament diameter φ is 0.11 mm as shown in FIG. 2.

Figure 4:
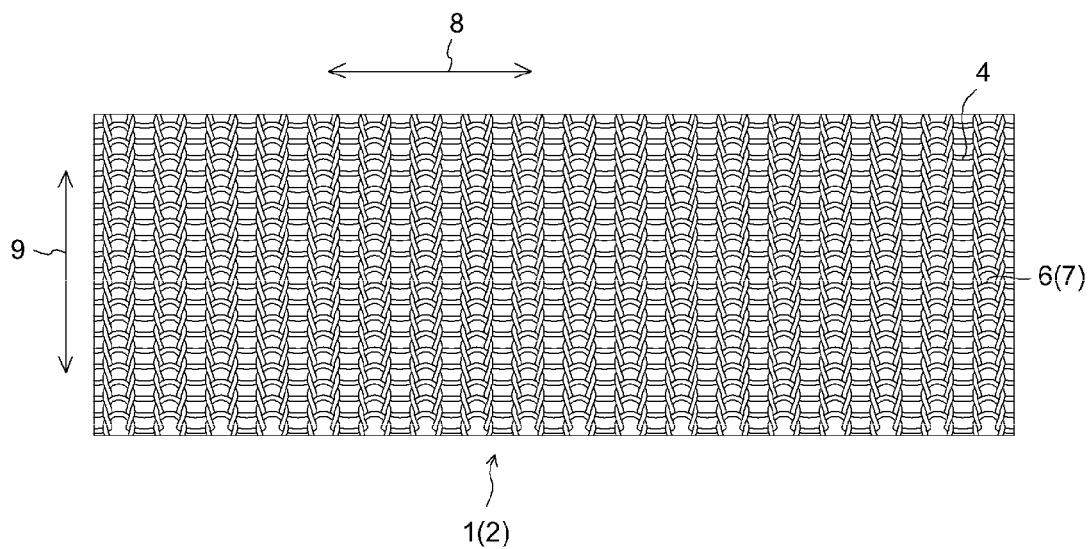
FIG. 4 Plan view of conveyor belt, showing conveyor belt comprising knit fabric in accordance with the present invention.

FIG. 4 shows a plan view of endless belt 2 which is a conveyor belt 1 formed by weft knitting in accordance with the present invention, the direction of knitting of knit pattern 5 at weft knit fabric 4 being in the gauge direction, i.e., conveying direction 8. Yarn 6 making up knit pattern 5 of this weft knit fabric 4 is formed from filament(s) 7.

FIG. 5 shows a plan view of endless belt 2 which is a conveyor belt 1 having inlay yarn 6a which is formed such that inlay yarn 6a is inserted so as to be directed in the conveying direction at central portion(s) in the width direction 9 of conveyor belt 1 comprising weft knit fabric as well as a side view thereof, the direction of knitting of weft knit pattern 5 being in the conveying direction 8, i.e., the gauge direction.

Figure 6:
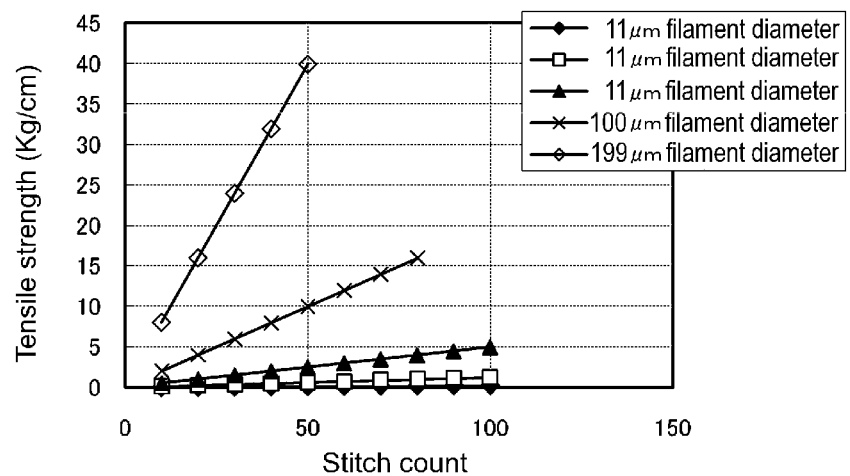
FIG. 6 Graph showing relationship between stitch count of the filament diameter in question which is shown on the horizontal axis, and tensile strength which is shown on the vertical axis, for several filament diameters.

FIG. 6 is a graph showing results of calculation of the relationship between stitch count and tensile strength when stitch count in the width direction 9 from which belt 2 is formed is varied, where a single loop 10 is formed from a single stitch, for five filament diameters φ, these being 11 μm, 25 μm, 50 μm, 100 μm, and 199 μm, using filament(s) 7 comprising Nylon (trade name), i.e., polyamide fiber(s). As shown in FIG. 6, it is clear that filament diameter φ for continuous fiber(s) should be not less than 50 μm to be a usable diameter, and it is more preferred that filament diameter φ be not less than 100 μm.

Figure 7:
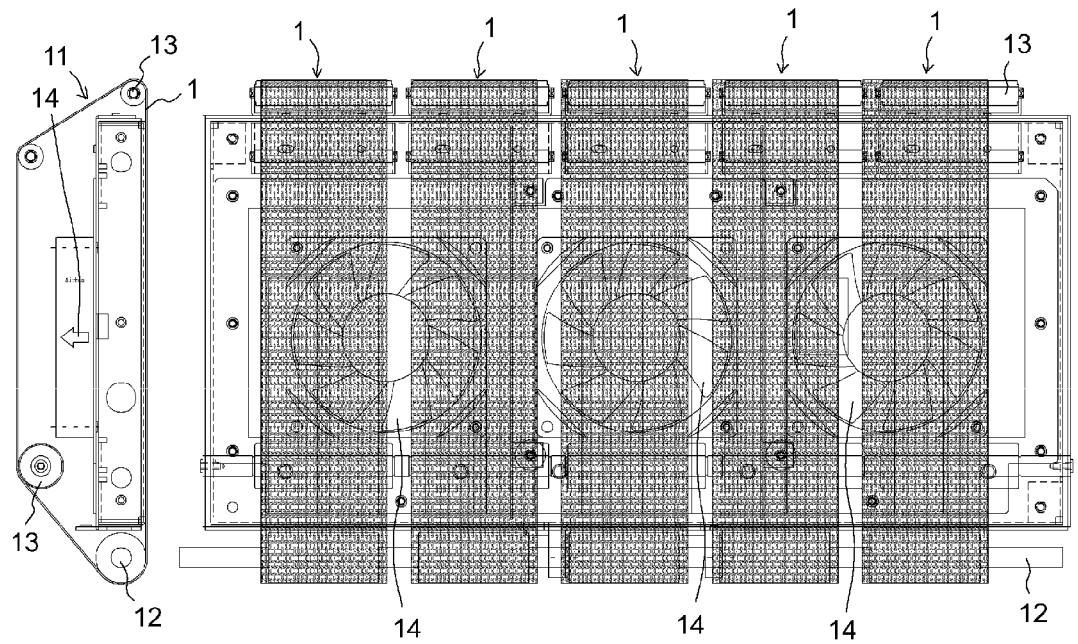
FIG. 7 Side view and plan view of a conveyor apparatus having air suction in which a conveyor belt in accordance with the present invention is installed.

FIG. 7 shows a side view and a plan view of an example of a conveyor apparatus having a conveyor belt in accordance with the present invention. Air fan(s) 14 for suction of air are present at the underside of conveyor belt 1, the constitution being such as to permit an object to be conveyed which is placed on conveyor belt 1 to be drawn thereto by suction and conveyed thereby.

WORKING EXAMPLES

Figure 9:
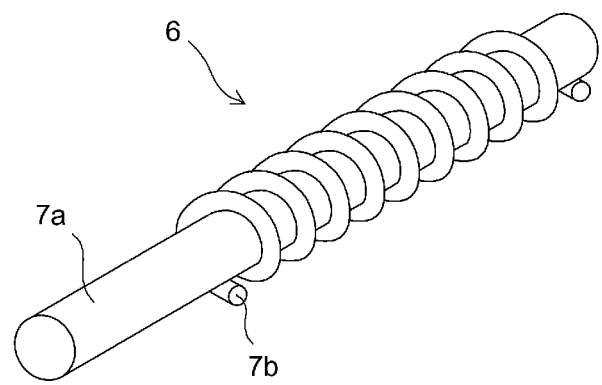
FIG. 9 Drawing showing in schematic fashion the constitution of covered yarn having filament materials as indicated at Working Example 6 in TABLE 1.

Shown in TABLE 1 is comparison of Working Examples 1 through 6 of a conveyor belt 1 in accordance with the present invention and a Comparative Example of a conveyor belt having mesh made in plain weave which was woven fabric. As indicated at TABLE 1, these conveyor belts 1 were such that steam heat-setting was carried out at a temperature of 115° C. Filament material at Working Examples 1 through 4 and at Working Example 6 was Nylon (trade name; hereinafter "nylon"), i.e., polyamide fiber, thickness of nylon fibers for example being 220 (D/F) at Working Example 1. Note that D at (D/F) indicates decitex; while F indicates fibers, this being a unit for indicating number of fibers. At Working Examples 1 through 4, to increase the coefficient of friction of nylon with respect to the conveying direction of weft knit conveyor belt 1, yarn comprising urethane fiber(s), being elastic fiber(s) having low melting point(s), was used to carry out plating with respect to the material of these filaments 7 over the entire surface of conveyor belt 1 so that it would be incorporated within knit fabric 4 which was made of nylon, causing it to appear at the front side of conveyor belt 1. Furthermore, at Working Example 6, yarn 6 is formed from single covered yarn. As shown in FIG. 9, such covered yarn may be double covered yarn DCY or may be single covered yarn SCY formed by wrapping continuous-fiber filament(s) about core filament(s). The filament(s) serving as core in the present invention are nylon filament(s) 7a, and the continuous-fiber filament(s) wound thereover comprise urethane filament(s) 7b. As a result of employment of filament material comprising such constitution, values for the static coefficient of friction at the surface of conveyor belt 1 were, as shown in TABLE 1, around 1.0. Note that because the filament material of which the covered yarn of Working Example 6 was comprised was such that the blend of urethane was not particularly different at front and back, the static coefficient of friction at the back was 0.839, while at the front the coefficient of friction was 0.919, which is a value near thereto, both of which are high values near 1.0. On the other hand, at Working Example 5, where conveyor belt 1 was formed from knit fabric 6 comprising filament(s) of only nylon, there having been no urethane fiber, which is an elastic fiber having low melting point, present therein, the static coefficient of friction at the front of the belt was 0.28, while at the back thereof it was 0.23, both of which are low values. The Comparative Example was a conveyor belt comprising woven fabric having mesh made in plain weave constituted from ordinary warp yarn and weft yarn at 60 threads per inch.

TABLE 1

|  | Working Example 1 | Working Example 2 | Working Example 3 | Working Example 4 | Working Example 5 | Working Example 6 | Comparative Example |
|---|---|---|---|---|---|---|---|
| Mesh configuration | Knit fabric | Knit fabric | Knit fabric | Knit fabric | Knit fabric | Knit fabric | Woven fabric |
| Filament material | Nylon 220 (D/F) (170 μm) | Nylon 220 (D/F) (170 μm) | Nylon 110 (D/F) (120 μm) | Nylon 110 (D/F) (120 μm) | Nylon 220 (D/F) (170 μm) | Covered yarn Core: nylon 220 (D/F) Covering: urethane 110 (D/F) | Polyester (150 μm) 60 (yearns/inch) Surface coating present |
|  | Urethane 110 (D/F) | Urethane 110 (D/F) × 2 | Urethane 110 (D/F) | Urethane 110 (D/F) × 2 | — |  |  |

TABLE 1-continued

| | Working Example 1 | Working Example 2 | Working Example 3 | Working Example 4 | Working Example 5 | Working Example 6 | Comparative Example |
|---|---|---|---|---|---|---|---|
| Heat-setting (115° C. steam) | Yes | Yes | Yes | Yes | Yes | Yes | Yes |
| Distance (mm) in stitch direction: $Ps_0$ (distance between where loops make contact (calculated value)) | 0.68 | 0.81 | 0.53 | 0.68 | 0.53 | — | — |
| Measured value: $Ps_1$ | 0.39 | 0.4 | | 0.5 | 0.4 | | — |
| Airflow resistance (KPa·s/m) | 0.0047 | 0.0114 | 0.003 | 0.0069 | 0.0027 | 0.0091 | 0.0045 |
| Static coefficient of friction: front (as measured according to JIS) | 1.27 | 1.0 | 0.98 | 0.98 | 0.28 | 0.919 | 1.08 |
| Static coefficient of friction: back (as measured according to JIS) | 0.22 | 0.51 | 0.19 | 0.22 | 0.23 | 0.839 | 0.21 |
| Belt buckling strength (load) | 550 g | — | — | — | — | — | 490 g |
| Percentage elongation when 10 N applied over 15 mm width | 6.7 | 6.8 | 40.7 | 32.1 | 12.1 | 7.5 | 10.8 |
| Fraying at edges (as determined by rubbing with #120 sandpaper) | ○ | ○ | ○ | ○ | ○ | ○ | X |

At TABLE 1, resistance to airflow, i.e., air permeability, at the conveyor belts of Working Examples 1 through 6 in accordance with the present invention which comprise knit fabric in a configuration made up primarily of nylon and the conveyor belt having mesh made in plain weave in accordance with the Comparative Example will first be compared. These airflow resistance values were measured using an airflow resistance device (KES-F8-AP1 airflow resistance measuring device manufactured by Kato Tech Co., Ltd.), taking the average of five runs of standard measurements under conditions employing a three-second discharge and a three-second intake, using a $2\pi$ cm$^2$ airflow depressor plate, with measurement sensitivity being set the 200 Pa high-level range. Working Example 1 in accordance with the present invention had an airflow resistance value of 0.0047 KPa·s/m, while the conveyor belt having mesh made in plain weave in accordance with the Comparative Example had an airflow resistance value of 0.0045 KPa·s/m, the two low airflow values being more or less equivalent. Furthermore, Working Example 2 in accordance with the present invention had an airflow resistance value of 0.0114 KPa·s/m, Working Example 3 had an airflow resistance value of 0.0030 KPa·s/m, Working Example 4 had an airflow resistance value of 0.0069 KPa·s/m, Working Example 5 had an airflow resistance value of 0.0027 KPa·s/m, and Working Example 6 had an airflow resistance value of 0.0091 KPa·s/m. Accordingly, it is clear that the airflow resistance value of the conveyor belt comprising knit fabric in accordance with present invention can be arbitrarily adjusted to any desired airflow resistance value over a range as wide as the 0.0027 KPa·s/m of Working Example 5 to the 0.0114 KPa·s/m of Working Example 2.

Moreover, static coefficient of friction was measured according to the procedure at JIS K 7125 using a static/dynamic friction measuring device (tribo static/dynamic friction measuring device T1201Ts manufactured by Trinity Lab Inc.) with a load of 200 g, at an ambient temperature of 20° C.±4° C., at an ambient humidity of 65%±4%, with a sample size of 130 mm×63 mm, on an aluminum sliding surface, at a speed of 10 mm/s. As a result, static coefficient of friction for Working Examples 1 through 4, which were examples in which plating with low-melting-point urethane fiber was carried out was, at Working Example 1, 1.27 for the front, and 0.22 for the back; at Working Example 2, 1.0 for the front, and 0.51 for the back; at Working Example 3, 0.98 for the front, and 0.19 for the back; and at Working Example 4, 0.98 for the front, and 0.22 for the back. That is, carrying out plating in accordance with a method in which urethane fiber(s), which are elastic fiber(s) having low melting point(s), were mixed among and knitted together with nylon fiber(s) made it possible to obtain static coefficients of friction which for these Working Examples were around 1.0, such that the a conveyor belt 1 comprising knit fabric 4 in accordance with the present invention would be able to convey objects to be conveyed without slippage thereof. Moreover, for Working Example 5, at which plating with urethane fiber was not carried out, because plating yarn having urethane fiber was not present, the value for the front was 0.28, while for the back it was 0.23, these being low values. Furthermore, at Working Example 6, which comprised single covered yarn as filament material, because the filament material at both the front and the back comprised the same single covered yarn, static coefficient of friction was 0.919 at the front, and 0.839 at the back, such that while there was some difference in values due to movement and so forth of the urethane fibers wrapped thereabout, both values were high and near 1.0. On the other hand, at the Comparative Example, because surface coating has been carried out thereon, static coefficient of friction was 1.08 at the front, and 0.21 at the back, which was equivalent to the Working Examples in accordance with the present invention. However, if surface coating had not been carried out, it would have been lower than at Working Examples 1 through 4 and Working Example 6 in accordance with the present invention. Accordingly, in such case, where conveyor belt 1 comprises woven fabric at which surface coating has not been carried out, since objects to be conveyed will tend to slip off of conveyor belt 1, proper conveyance thereof will not be possible unless suction of air is carried out from mesh potion(s) made, for example, in plain weave at conveyor belt 1 so that objects to be conveyed are drawn to the mesh portion(s) during conveyance thereof.

Moreover, regarding fraying at side ends 3 of conveyor belt 1, the surface of the side end 3 of conveyor belt 1 was rubbed with No. 120 sandpaper, as a result of which fraying of the conveyor belt 1 at the Comparative Example made in plain weave was found to occur upon being rubbed 1 to 2 times. This is shown by an "X" at TABLE 1 to indicate that this was unsatisfactory. In contrast, at side ends 3 of conveyor belt 1 in accordance with the present invention, the results were satisfactory for all Working Examples, no fraying phenomena being observed despite their having been rubbed 10 or more times. This is shown by an "O" at TABLE 1 to indicate that this was satisfactory.

Figure 8:
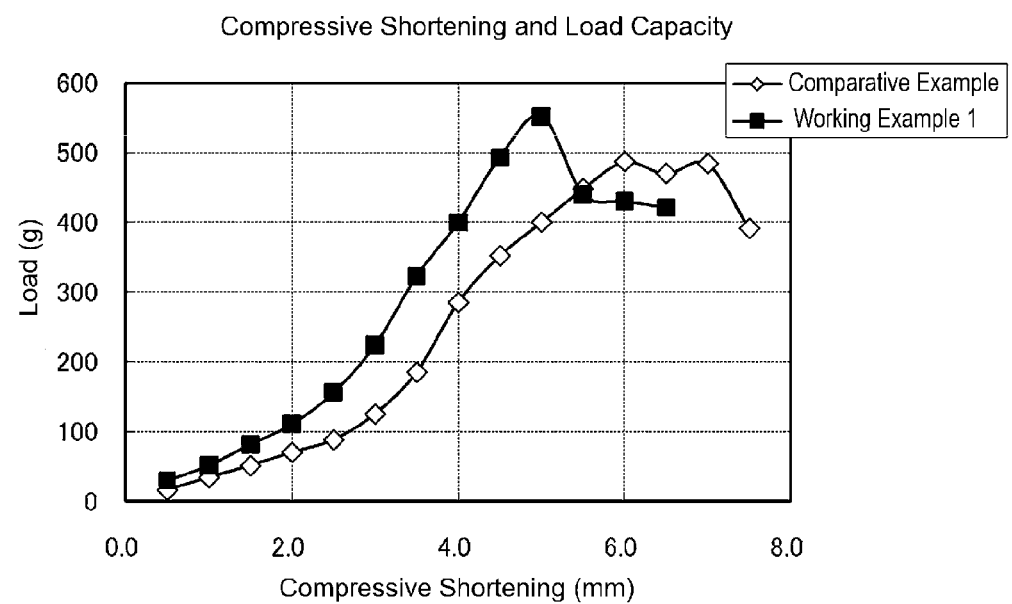
FIG. 8 Graph showing relationship between compressive shortening and load capacity obtained using a conveyor belt in accordance with a working example of the present invention and using a conveyor belt in accordance with a comparative example.

Moreover, with regard to buckling strength of the conveyor belt, conveyor belt 1 manufactured from yarn 6 containing filament(s) of filament diameter $\phi$ 125 μm was fashioned into columnar shape and made to stand such that the gauge direction of knit fabric 4 was made to be vertical, buckling strength of the conveyor belt being tested by application of a load from above, which is to say that buckling strength in the gauge direction of conveyor belt 1 was tested, testing having been carried out by forming the belt made of knit fabric at Working Example 1 and the belt made of woven fabric at the Comparative Example into endless belts comprising identical inside diameters and identical widths which were wrapped about belt pulleys, the results of this testing being shown in TABLE 1. Moreover, FIG. 8 shows a graph of the relationship between load and compressive shortening for Working Example 1 and the Comparative Example in TABLE 1. At shown in this FIG. 8, upon comparing the buckling strengths of Working Example 1 in accordance with the present invention and the Comparative Example, which had more or less identical airflow resistance values, buckling strength of Working Example 1 in accordance with the present invention was found to be higher than that of the Comparative Example, load at buckling for the Comparative Example having been 490 g, i.e., 4.8 N, and load at buckling for conveyor belt 1 comprising knit fabric in accordance with the present invention having been 550 g, i.e., 5.4 N, as shown in TABLE 1, indicating that the conveyor belt 1 comprising knit fabric in accordance with the present invention was a conveyor belt 1 of high strength.

Moreover, as shown in TABLE 1, percentage elongation (%) of belt 2 comprising knit fabric in accordance with the present invention, when a load of 10 N was applied to belt 2 comprising knit fabric in accordance with the present invention which was 15 mm in width, was 6.7 for Working Example 1, 6.8 for Working Example 2, 40.7 for Working Example 3, 32.1 at Working Example 4, and 7.5 for Working Example 6. On the other hand, this was 12.1 at Working Example 5, which was similar to Working Example 2 except that plating of urethane yarn was not carried out. And this was 10.8 at the woven fabric obtained having surface coating at the Comparative Example.

Whereas use of a conveyor belt comprising knit fabric had been found to be difficult conventionally from the standpoint of percentage elongation, strength in the axial direction, and so forth, it was determined, as indicated by the Working Examples in accordance with the present invention, that belt 2 comprising knit fabric could be employed as a conveyor belt 1 which was in no way inferior to a belt comprising woven fabric.

EXPLANATION OF REFERENCE NUMERALS

1 Conveyor belt
2 Belt
3 Side end
4 Knit fabric
5 Knit pattern
6 Yarn
6a Inlay yarn
7 Filament
7a Nylon monofilament
7b Urethane monofilament
8 Conveying direction (gauge direction)
9 Width direction (stitch direction)
10 Loop
11 Conveyor apparatus
12 Drive roller
13 Idler roller
14 Air fan
Pg Pitch of loops in gauge direction
Ps Pitch of loops in the stitch direction
$\phi$ Filament diameter
L0 Distance between intertwinings of filament(s) under conditions not causing deformation of loops
L1 Distance between intertwinings of filament(s) under conditions causing deformation of loops

| EXPLANATION OF REFERENCE NUMERALS | |
|---|---|
| 1 | Conveyor belt |
| 2 | Belt |
| 3 | Side end |
| 4 | Knit fabric |
| 5 | Knit pattern |
| 6 | Yarn |
| 6a | Inlay yarn |
| 7 | Filament |
| 7a | Nylon monofilament |
| 7b | Urethane monofilament |
| 8 | Conveying direction (gauge direction) |
| 9 | Width direction (stitch direction) |
| 10 | Loop |
| 11 | Conveyor apparatus |
| 12 | Drive roller |
| 13 | Idler roller |
| 14 | Air fan |
| Pg | Pitch of loops in gauge direction |
| Ps | Pitch of loops in the stitch direction |
| $\phi$ | Filament diameter |
| L0 | Distance between intertwinings of filament(s) under conditions not causing deformation of loops |
| L1 | Distance between intertwinings of filament(s) under conditions causing deformation of loops |

The invention claimed is:
1. A conveyor belt having knit fabric suited for conveying paper, sheets or objects by virtue of air permeability by suction of air, comprising:

weft knit fabric; yarn, which forms the conveyor belt, includes a filament that is synthetic continuous fiber; the filament of the yarn is mutually intertwined to form a knit pattern having mesh loops such that pitch of the mesh loops formed in a stitch direction which is a width direction is smaller than pitch of the mesh loops formed in a gauge direction which is a conveying direction; a state is maintained in which the mutually contacting mesh loops are deformed and the filament of the mesh loops are entangled so as to increase the strength in the conveying direction as a result of the mutual intertwining of the filament thereby increasing the strength and preventing fraying of yarn filament at belt side ends during conveying by the conveyor belt.

2. The conveyor belt having knit fabric according to claim 1, wherein the weft knit fabric has gaps that are produced by the knit fabric; and wherein when the yarn employed in the knit fabric includes monofilament, flexural stress and heat experienced by the monofilament of the yarn causes the monofilament of the yarn to undergo plastic deformation at mesh loop locations where the monofilament mutually intersects and becomes entangled so as to maintain the entangled state, and wherein when the yarn employed in the knit fabric is yarn comprising a plurality of filaments, flexural stress and a prescribed amount of heat experienced by the plurality of the filaments of the yarn causes the plurality of the filaments of the yarn to undergo plastic deformation at the mesh loop locations where the plurality of the filaments of the yarn mutually intersect and become entangled so as to maintain the entangled state.

3. The conveyor belt having knit fabric according to claim 2 characterized in that the belt, in which flexural stress and heat have caused the yarn to undergo plastic deformation such that an entangled state is maintained, is a conveyor belt in which the yarn causes a front surface and a back surface to both have the same coefficient of friction, or is a conveyor belt in which the yarn causes the front surface and the back surface to have different coefficients of friction.

4. The conveyor belt having knit fabric according to claim 3 characterized in that, to increase coefficients of friction at the conveyor belt in which the yarn causes the front surface and the back surface to have different coefficients of friction, the belt is knit from yarn which has been subjected to twisting and in which low-melting-point elastic filament is included within the yarn which comprises a plurality of filaments, or is knit using low-melting-point elastic filament and monofilament in accordance with a plating technique, flexural stress during knitting causing filament other than said low-melting-point elastic filament to undergo plastic deformation, and heat-setting causing said low-melting-point elastic filament to fuse, stabilizing the intersecting and entangled state; and where twisted yarn or covered yarn is used, coefficient of friction is increased at the front and the back of the belt; and if a plating technique is employed, coefficient of friction is increased at whichever of the front surface and/or the back surface it is required.

5. The conveyor belt having knit fabric according to claim 2 characterized in that the yarn contains inlay yarn of low percentage elongation; and knitting said yarn into the belt at an arbitrary location in the width direction thereof suppresses percentage elongation in the conveying direction and regulates meandering of the conveyor belt.

6. A conveyor apparatus employing a conveyor belt comprising knit fabric characterized in that the conveyor belt having knit fabric according to claim 1 has been adapted for use with an apparatus having conveyor means requiring air permeability with respect to air suction.

* * * * *